United States Patent
Choate

(10) Patent No.: US 10,613,840 B1
(45) Date of Patent: Apr. 7, 2020

(54) CONVERTING PROGRAMS TO VISUAL REPRESENTATION WITH INTERCEPTING SCREEN DRAWS

(71) Applicant: TG LLC, Los Altos, CA (US)

(72) Inventor: Eric Choate, Berkeley, CA (US)

(73) Assignee: TG, Inc

(*) Notice: Subject to any disclaimer, the term of this patent is extended or adjusted under 35 U.S.C. 154(b) by 0 days.

(21) Appl. No.: 14/600,942

(22) Filed: Jan. 20, 2015

Related U.S. Application Data

(60) Provisional application No. 61/928,927, filed on Jan. 17, 2014.

(51) Int. Cl.
| G06F 9/44 | (2018.01) |
| G06F 9/445 | (2018.01) |
| G06F 8/34 | (2018.01) |
| G06F 16/23 | (2019.01) |

(52) U.S. Cl.
CPC ............... *G06F 8/34* (2013.01); *G06F 16/23* (2019.01)

(58) Field of Classification Search
CPC ...... G06F 8/34–38; G06F 9/455; G06F 17/30; G06F 17/28; G06F 16/23; G06F 17/30345
See application file for complete search history.

(56) References Cited

U.S. PATENT DOCUMENTS

| 5,717,956 | A   | * | 2/1998 | Shinosaka | G06F 13/105 710/14 |
| 7,746,986 | B2  | * | 6/2010 | Bucchieri | G06F 17/2872 379/52 |
| 8,370,823 | B2  | * | 2/2013 | Bashkansky | G06F 8/443 717/131 |
| 9,015,678 | B2  | * | 4/2015 | Aoyama | G06F 11/3684 717/136 |
| 9,442,744 | B2  | * | 9/2016 | Lerum | G06F 9/454 |
| 2003/0126559 | A1 | * | 7/2003 | Fuhrmann | G06F 17/28 715/229 |
| 2006/0130006 | A1 | * | 6/2006 | Chitale | G06F 17/275 717/136 |
| 2006/0130031 | A1 | * | 6/2006 | McHugh | G06F 17/212 717/162 |

(Continued)

OTHER PUBLICATIONS

Laurent Wouters, Multi-Domain Multi-Lingual Collaborative Design, 2013, pp. 269-274. https://ieeexplore.ieee.org/stamp/stamp.jsp?tp=&arnumber=6580974 (Year: 2013).*

(Continued)

*Primary Examiner* — Mongbao Nguyen

(57) ABSTRACT

Modifying or replacing application program portions, from a first format to a second format, each of which makes substantially similar screen presentations, but with a different device or environment. The program instructions might have originally been developed for use with a particular mobile device or Operating System (OS). Once modified, the app can be used with some other device or OS, with substantially similar functions. The app could be modified to have outputs and inputs in a different human language. The app could alternatively be modified to allow a translator to observe, and possibly modify, the outputs and inputs to be in a different human language.

10 Claims, 2 Drawing Sheets

(56) References Cited

U.S. PATENT DOCUMENTS

| | | | |
|---|---|---|---|
| 2007/0006039 A1* | 1/2007 | Fichter | G06F 11/3688 714/38.14 |
| 2008/0189096 A1* | 8/2008 | Apte | G06F 9/454 704/2 |
| 2008/0189682 A1* | 8/2008 | Rude | G06F 17/21 717/111 |
| 2009/0164202 A1* | 6/2009 | Lonnemark | G06F 8/52 703/22 |
| 2009/0228785 A1* | 9/2009 | Creekbaum | G06F 17/212 715/239 |
| 2009/0273605 A1* | 11/2009 | Takebayashi | G06F 11/3668 345/545 |
| 2010/0235162 A1* | 9/2010 | Faddoul | G06F 17/2818 704/6 |
| 2010/0281240 A1* | 11/2010 | Brewis | G06F 11/3612 712/234 |
| 2012/0089905 A1* | 4/2012 | Chafy | G06F 17/241 715/254 |
| 2012/0151437 A1* | 6/2012 | Kneisel | G06F 8/31 717/114 |
| 2012/0317493 A1* | 12/2012 | Vilke | G06F 3/01 715/738 |
| 2013/0144596 A1* | 6/2013 | Lui | G06F 17/2705 704/2 |
| 2013/0226555 A1* | 8/2013 | Lerum | G06F 9/454 704/2 |
| 2013/0227522 A1* | 8/2013 | Lerum | G06F 9/44 717/120 |
| 2013/0253901 A1* | 9/2013 | Krack | G06F 17/289 704/2 |
| 2013/0283151 A1* | 10/2013 | Deguzman | G06F 17/30905 715/239 |
| 2013/0338995 A1* | 12/2013 | Elkins | G06F 17/28 704/2 |
| 2014/0081625 A1* | 3/2014 | Wilensky | G06F 17/2785 704/9 |
| 2014/0136180 A1* | 5/2014 | Little | G06F 9/454 704/2 |
| 2014/0157248 A1* | 6/2014 | Kimura | G06F 8/4442 717/151 |
| 2014/0172408 A1* | 6/2014 | Vukosavljevic | G06F 17/211 704/2 |
| 2014/0195240 A1* | 7/2014 | Laker | G06F 8/38 704/260 |
| 2014/0201715 A1* | 7/2014 | Aoyama | G06F 11/3684 717/124 |
| 2014/0249797 A1* | 9/2014 | Liu | G06F 17/2288 704/2 |
| 2014/0258857 A1* | 9/2014 | Dykstra-Erickson | G06F 3/0481 715/708 |
| 2014/0280259 A1* | 9/2014 | McGillin | G06F 17/2863 707/756 |
| 2015/0154181 A1* | 6/2015 | Dmytryshyn | G06F 9/4448 704/2 |
| 2015/0220512 A1* | 8/2015 | Heinemeyer | G10L 15/005 704/2 |
| 2015/0304337 A1* | 10/2015 | Nguyen-Tuong | G06F 21/51 726/1 |

OTHER PUBLICATIONS

Multilignual localization core focus, 2011, pp. 1-13. https://multilingual.com/downloads/coreFocus119.pdf (Year: 2011).*

* cited by examiner

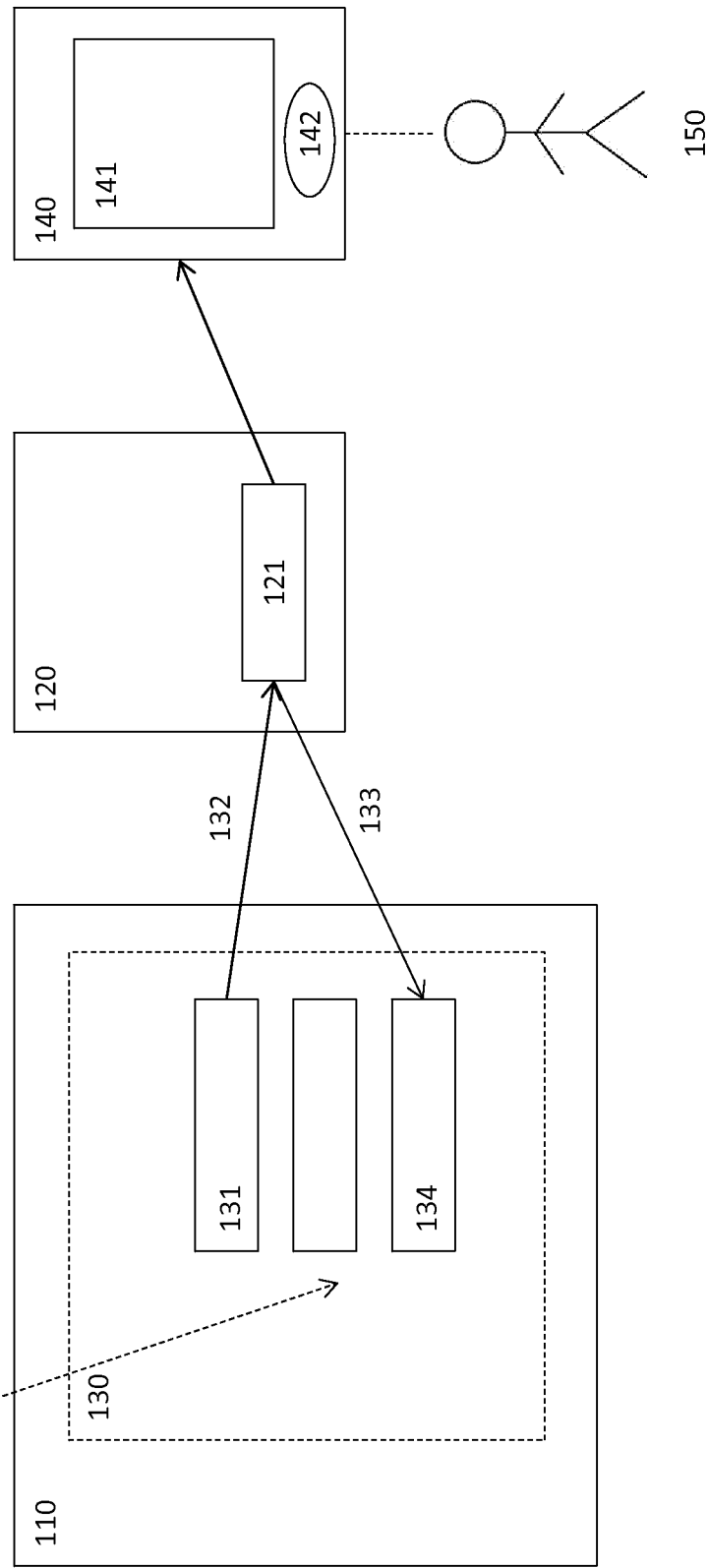

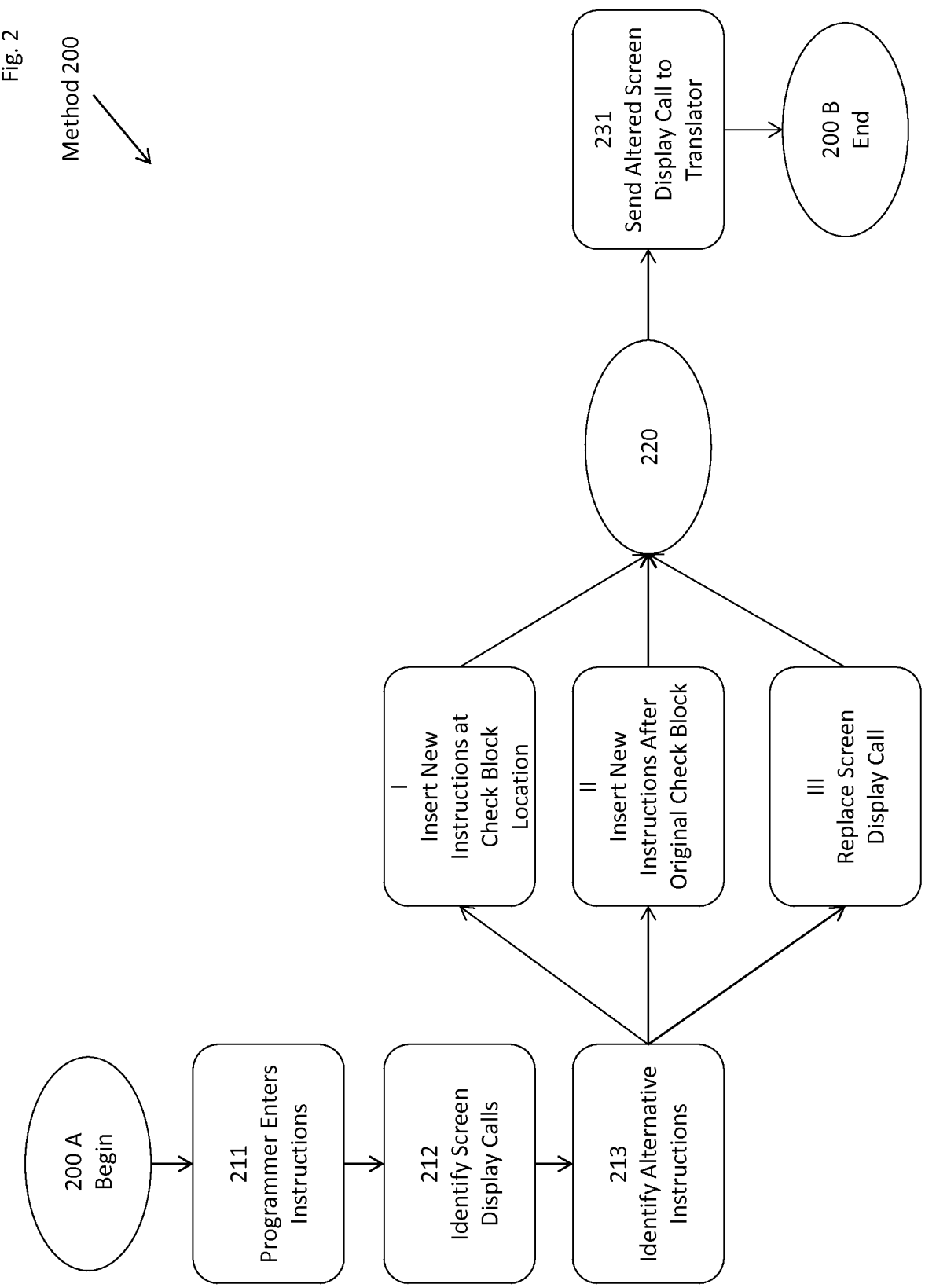

CONVERTING PROGRAMS TO VISUAL REPRESENTATION WITH INTERCEPTING SCREEN DRAWS

INCORPORATED DISCLOSURES

This Application incorporates the following documents by reference, as if fully set forth herein:

Application 61/873,616, filed Sep. 4, 2013, in the name of Vicki Thomas, titled "Translation in visual context."

Application 61/873,638, filed Sep. 4, 2013, in the name of Stanton Kee Nethery III, titled "User corrections of translation."

Application 61/873,673, filed Sep. 4, 2013, in the name of Vicki Thomas, titled "Translation under constraints."

Application 61/873,665, filed Sep. 4, 2013, in the name of Stanton Kee Nethery III, titled "Translation on demand."

Application 61/928,918, filed this same day, Jan. 17 2014, in the name of Eric Choate, titled "Converting programs to visual representation with reading compiled binary."

Application 61/928,927, filed this same day, Jan. 17 2014, in the name of Eric Choate, titled "Converting programs to visual representation with intercept screen draws."

These documents are sometimes collectively referred to herein as the "Incorporated Disclosures," the "Incorporated Documents," or a variant thereof.

BACKGROUND

Field of the Disclosure

This Application relates to converting software program instructions using interception of screen draw commands, and other matters.

Background of the Disclosure

It sometimes occurs that it can be desirable to convert a set of software program instructions from a first form to a second form, the second form having the property of preserving the visual presentation made by the program, but not necessarily any other factor.

For a first example, in a translation system, it can be desirable for a natural-language translator to be able to examine the software program, but not necessarily using the same device or system configuration on which the program was developed or generated. In such examples, the original programmer might have used a relatively robust computer system capable of executing an integrated development environment (IDE) for the program, while the natural-language translator has only a relatively modest computer system capable of displaying and editing web pages.

For a second example, in a distributed development environment, it can be desirable for a first programmer to be able to construct and modify at least portions of the program in a first IDE for the program, which might have a first set of available tools and a first IDE-programmer interface. A second programmer might also be able to construct and modify at least portions of the program as well, but in a second IDE for the program, in which the second IDE has available a second set of tools and a second IDE-programmer interface. Notwithstanding that the program is being developed in both a first IDE and a second IDE, it might occur that the program is eventually intended to be integrated into a whole capable of being executed to present a visual or other presentation.

Each of these issues, either alone or in combination with other matters, at some times, or in some conditions, can cause a problem with respect to converting programs to visual representation, with respect to related matters, or some combination or conjunction thereof.

SUMMARY OF THE DESCRIPTION

This Application provides systems and techniques (such as embodied in machines, methods, articles of manufacture, composition of matter, and any other patentable subject matter), which can ameliorate the problems described above, as well as others.

In one embodiment, a method can modify or replace portions of a program, such as an application (sometimes referred to herein as an "app"). The app can have a first format including human-readable program code that makes certain presentations upon the screen (or other outputs as described herein), which can be compiled into binary program code, which can be executed by a computing device to provide or generate one or more images or other types of output. The app can have a second format including human-readable program code that makes substantially the same presentations upon the screen (or other outputs as described herein), but has been modified as described herein to execute or just display and not execute on a different type of device or environment.

In the embodiments described or shown herein, or otherwise disclosed herein, the app's second format can show the app's outputs (such as screen shots, audio/video, or other outputs, as described herein), without necessarily executing or simulating the app's functionality. For one example, if the app's first format has external side-effects, such as to process information or send messages, the app's second format need not include these side-effects, and can merely present the same outputs as the app's first format. This has the effect that the app's second format can be executed or simulated however desired by the translator, with the translator identifying substitute outputs in the app's second format that are substantial equivalents to the outputs in the app's first format, without concern that doing so would cause the app to wreak havoc on anyone's data, or receive or send messages that are undesired.

For example, the program instructions might have been developed for use with the iOS™ Operating System, such as might be used on a variant of an iPad™, iPhone™, iPod™, some other iDevice, or some other mobile device, or some other emulation environment that can be used with the iOS™ Operating System, some other OS, or otherwise. Once modified, the app can be executed (depending on the type of modification) in conjunction with the same or some other OS, while presenting substantially similar functions.

In a first such case, the program instructions can be modified so that the program makes outputs and accepts inputs in a language different from the one for which it was originally designed. This could provide, for example, for substantially automated modification of the app from a first natural human-readable language, such as English, into a second natural human-readable language, such as Spanish or Mandarin. With sufficient information, the app could be substantially automatically translated from its original user interface (UI) language into hundreds of other human, natural languages.

In a second such case, the program instructions can be modified so that the program makes outputs and accepts inputs in a language in which the only intended similarity is that those outputs and inputs are substantially similar. The outputs and inputs of the modified app can themselves be altered or appended to, with the effect that the app can be substantially translated from its original UI language into a human, natural language different from the one for which it was originally designed.

In one embodiment, the method examines code known to be explicit screen display calls to the iOS™ Operating System. Upon examining the first format, the method determines a set of program instructions in the second format that would have the same presentation effect (such as the same visual effect). This latter set of program instructions in the second format can be used by a translator altering the symbols and text presented to the user, or by the second programmer to achieve the same presentation effect as the first programmer.

When those portions of the program are identified that make outputs in the source human language, those portions of the program can be replaced with instructions suited to a different device (such as calls to selected subroutines in a program library). For example, the program might be written so as to be executed on a handheld media device such an iPad™ or iPhone™. Elements of the program can be replaced with program code that can be executed on a laptop or desktop business machine. Those elements of the program that make outputs in the source human language can be altered or replaced to provide program code that makes outputs in the target human language, such as by a translator, without the translator needing to have any knowledge of the original program code.

In such embodiments, once translated, the altered or replaced portions can be sent to the programmer, who can combine those elements of the program code that were altered or replaced with those elements of the program code that were untouched, to provide a version of the program that operates in the target human language. For example, a game program written in English can be translated into Spanish or Mandarin.

BRIEF DESCRIPTION OF THE FIGURES

FIG. 1 shows a conceptual drawing of a system.
FIG. 2 shows a conceptual drawing of a method.

DETAILED DESCRIPTION OF SOME EMBODIMENTS

Figures and Text

FIG. 1—System Elements

SYSTEM—A system 100 includes at least those elements shown in the figure, and possibly other elements not shown but described herein or otherwise known in the art. These elements can include such elements as a programmer workstation 110, an OS or emulator thereof 120, and a software application program ("app") 130. The app 130 can include one or more instructions 131, at least one of which can be disposed to call upon the OS or emulator thereof 120, to modify a presentation to a mobile device 140, such as to a screen 141 on that mobile device 140, and ultimately to a user 150.

In one embodiment, the instruction 131 disposed to call upon the OS 120 to modify a presentation to a mobile device 140 is sometimes referred to herein as a "screen display call," although technically the presentation need not be made by a screen and need not be a display. Operation of the screen display call instruction 131 is shown in the FIG. 1 by an arrow showing a first flow of control 132 (a request to display) from the instruction 131 to the emulator 120, and by an arrow showing a second flow of control 133 (a response to the request) from the emulator 120 back to the app 130, possibly at a second instruction 131 (other than a screen display call instruction 131). In one embodiment, the entire emulator 120 need not be involved in emulation of the screen display call instruction 131; rather, a portion of a standard emulator 120 can be modified or augmented, so as to catch such requests to display from the app 130 being emulated, and so as to throw responses to such requests back to the app 130 being emulated.

In one embodiment, the first flow of control 132 (the request to display) can include data parameters, such as representing location on the screen 141, size of the display on the screen 141, and text to be displayed. Moreover, in one embodiment, the second flow of control 133 (the response to request) can include data parameters, such as representing whether the request to display was successfully performed, and a perceivable display 141 that resulted from the display operation.

While this Application is primarily described with respect to visual presentation to a screen 141 on a mobile device 140, in the context of the invention, there is no particular requirement for any such limitation. For example, the screen display call instruction 131 could instead be disposed to request to present (rather than "display") audio or other sonic output, or outputs that can be otherwise detected by the user 150. For a first example, the presentation can include audio elements, such as spoken words, other sounds, audio-visual material, and otherwise. For a second example, the presentation can include other elements, such as buzzing, electric stimulation, haptic elements, or otherwise. Where the user 150 includes an electronic device, such as when the user 150 includes a control program, a machine learning or artificial intelligence device, or a transducer from electronic signals to human nerve impulses, the screen display call instruction 131 can include an output electronic signal disposed to be received as such.

Moreover, while this Application is primarily described with respect to an individual human user 150 capable of operating the mobile device 140 or viewing the screen 141 thereon, in the context of the invention, there is no particular requirement for any such limitation. For a first example, the presentation can include elements disposed for reception by users 150 who are animals, such as dogs, and can include ultrasonic elements that are capable of eliciting desired behavior from those animals. For a second example, the user 150 can include more than one human being operating conjunctively or cooperatively, such as a number of persons each authorized, or collectively authorized, to access the mobile device 140. For a third example, the user 150 can include another device, such as an artificial intelligence or machine learning program, a robot, or another control element.

In one embodiment, as described above, the system 100 can include both a first flow of control 132, along with associated parameter signals to the OS 120, indicating aspects of the request to display, and a second flow of control 133, along with associated parameter signals from the OS 120, indicating aspects of the response to the request. Aspects of the response to the request can include success or failure of the screen display call instruction 131. For example, in the programming language "Objective C" this signal is called "ViewDidLoad". Some, but not all, computer programmers check after the screen display call instruction 131 for the second flow of control 133 and the possible "ViewDidLoad" response. This is indicated in the figure by the presence of (an optional) success check block 134.

OPERATING SYSTEM—As described herein, the system 100 can include an OS 120, such as the Android OS, iOS OS, or another OS such as a Linux OS, Raspberry Pi OS, or a variant of one or more of these. The system 100 can be capable of receiving first commands, information, and/or instructions (sometimes referred to herein as first "display instructions") from the programmer workstation 110. The OS 120 can be capable of compiling or interpreting those first display instructions, with or without assistance (such as by additional devices similar to cloud computing devices, compiler or interpreter assistances, and/or graphical processing devices), into second display instructions, destined for the presentation device 140 and intended to cause the presentation device 140 to make such presentations as desired by the app. The second display instructions can be disposed to be generic in form, so as to be able to be compiled or interpreted and destined to be used on different types of presentation device 140.

In one embodiment, the OS 120 can include a display transceiver module 121, capable of receiving screen display call instructions 131 and compiling or interpreting those first display instructions 131 into control signals or other signals destined for the presentation device 140.

While this Application is primarily described with respect to the screen display call instructions 131 being formatted in a higher-level programming language such as Objective C, in the context of the invention, there is no particular requirement for any such limitation. Instead, in one embodiment, the program instructions that form the screen display call instructions 131 are typically derived from the higher-level programming language, when the program instructions in that higher-level programming language have been processed by a compiler or interpreter. Similarly, while this Application primarily describes the (optional) success check block 134 as being formatted in a higher-level programming language such as Objective C, in the context of the invention, there is no particular requirement for any such limitation. Instead, in one embodiment, the program instructions that form the success check block 134 are typically derived from the higher-level programming language, when the program instructions in that higher-level programming language have been processed by a compiler or interpreter.

Similarly, while this Application describes looking for the success check block 134, and possibly modifying those instructions or instructions near or about it, with respect to a higher-level programming language, in the context of the invention, there is no particular requirement for any such limitation. Instead, in one embodiment, the modification of the program instructions in or near the success check block 134 are typically performed at an assembly-code or machine-code level, or where the environment is so suited, at a Java byte code level for a Java virtual machine (JVM).

Similarly, the first display instructions can be formatted in Java byte code and can be readable by a software element embodied on a hardware computing device, or a first hardware device emulated in software on a second hardware device, such as a Java virtual machine (JVM). For a second example, the first display instructions can be formatted in a Lisp machine code and can be readable by a hardware device (or a first hardware device emulated in software on a second hardware device). For a third example, the first display instructions can be formatted as instructions for a Universal Turing Machine (UTM) or a Finite State Machine (FSM) and can be readable by a hardware device (or a first hardware device emulated in software on a second hardware device).

PRESENTATION DEVICE—As described herein, the system 100 can include a presentation device 140, such as a handheld media device or other mobile device. The presentation device 140 can include one or more presentation elements, such as one or more display screens 141 or otherwise, and can include one or more input elements 142, such as possibly buttons, pointing devices, touchpad elements, facial or fingerprint recognition, or otherwise.

While this Application is primarily described with respect to the presentation device 140 including one or more display screens 141 as presentation devices, in the context of the invention, there is no particular requirement for any such limitation. For example, the one or more presentation devices 140 can include elements disposed to present pictures (such as bitmap, raster, vector, or other elements perceivable or perceived by humans or others as visual input, whether in black and white, color, or other frequencies such as infrared—sometimes perceived as heat—or ultraviolet—sometimes perceived as florescence—), sounds (such as bells, buzzers, speakers, vibration elements, whistles, or other elements such as those capable of emitting infrasound —sometimes perceived as vibrations or other effects—) and/or capable of emitting ultrasound —sometimes transceivable into visual elements by other devices—, audio-visual elements (such as animation, motion pictures, and other combinations or synchronizations of sight and sound), electrical signals (sometimes perceived as muscular stimulation such as in various forms of medical procedures, tingling, or otherwise), haptic outputs (such as buzzing, shock, vibration, or otherwise), olfactory elements, or other possible outputs perceivable or perceived by humans or others. For example, presentation devices 140 can include elements that can be configured to be perceptible to non-human animals, such as cats or dogs, such as for the purpose of alerting or communicating with, or eliciting desired behavior from, such creatures.

While this Application is primarily described with respect to the presentation device 140 including buttons as input elements 142, in the context of the invention, there is no particular requirement for any such limitation. For example, the one or more presentation devices 140 can include other forms of input elements, such as touch pads, touch screens, proximity sensors, fingerprint detectors or sensors, devices capable of receiving or recognizing faces or facial expressions, gestures —whether intentional or otherwise—, muscle tension or pressure, olfactory inputs, speech —in one or more natural languages—, or other possible inputs.

In some embodiments, the one or more presentation devices 140 can include a smartphone, such as one using the Android or iOS operating system (OS), or another type of mobile presentation device, such as a mobile entertainment device similar to an iPad or other MP3 player, including one or more sets of information for entertainment (where that information includes instructions, they are sometimes referred to herein as software application programs or "apps", as further described herein), or other mobile computing device capable of performing the functions of the presentation device 140 as described herein. The presentation device 140 can also include a desktop, laptop, netbook, or other computing device capable of performing the functions of the presentation device 140 as described herein.

APPLICATION PROGRAM—The app 130 is generally provided by the programmer, and is intended to be executed or interpreted on the one or more presentation devices 140. In one embodiment, the app 130 interacts with one or more users 150, using the one or more presentation devices 140, and providing one or more user experiences as a consequence thereof. For example, the app 130 can provide a data analysis program for use by one or more users at the presentation device 140, or can provide an (educational, training, or other) game for use by one or more users 150 at the presentation device 140, or can provide a game for use by one or more users 150 at multiple presentation devices 140 (such as the games of Chess, "Scrabble,"™ or the game "World of Warcraft"™ available for concurrent use by multiple users 150 as players as disparate locations), or can provide a social media communication network for use by one or more users 150 at multiple presentation devices 140 (such as the social media communication networks available from Facebook™ or Twitter™ available for concurrent or separate use by multiple communicating users as disparate locations). Possibly more prosaically, the app 130 can provide a utility usable by one or more users at an individual presentation device 140, such as a utility for manipulating the functions or status of the individual presentation device 140 itself.

As described herein, the app 130 can include one or more screen display call instructions 131, providing execution/interpretation points at which the app 130 can attempt to write to the one or more screens 141 of the one or more presentation devices 140, or otherwise produce human-language output, as described herein. As described herein, the app 130 might have originally been written to provide these human-language outputs in a particular natural human language, such as English, and it might be desirable for particular users to instead provide these human-language outputs in a different natural human language, such as French or Mandarin. In such cases, as described herein, it would be desirable to identify all such instructions at which the app 130 attempts to write to the one or more screens 141 of the one or more presentation devices 140, or otherwise produce human-language output in a first natural language, as described herein, contemplating the possibility of replacing the strings, pictures, audio, or other output with different outputs in a second natural language.

As described herein, once the system 100 can identify those instructions in the app 130 at which the app 130 attempts to make an output to the presentation device 140 in a first natural language, the system can be capable of replacing those outputs with different outputs to the presentation device 140 in a second natural language, as described in further and other detail herein.

FIG. 2—Method of Operation

FIG. 2 shows a conceptual drawing of a method.

A method 200 can be performed by the apparatuses and system 100, or combinations or conjunctions of elements thereof. Where described herein that a step is performed by the method 200, it should be understood from context (or from the figure) which portion of the system 100 takes the specific actions described for that step.

Although the steps are shown in a particular order, in the context of the invention, there is no reason for any such limitation. The steps may be performed in a different order, or may be performed in a parallel or pipelined manner, or otherwise.

In one embodiment, the method 200 is performed in conjunction or cooperation with one or more programmers (not shown) and one or more translators (not shown). However, in some embodiments, the translators might not be strictly needed. As soon as the method 200 has identified those one or more screen display call instructions 131 related to the presentation device 140, the method 200 can send one or more descriptions of those operations from the programmer workstation 110 to the translator workstation (not shown). While this Application is primarily described with respect to the method 200 operating serially after identifying those one or more screen display call instructions 131 that are capable of presenting one or more outputs at the presentation device 140, in the context of the invention, there is no particular requirement for any such limitation. For example, the method 200 can operate concurrently or in conjunction with, or in parallel with, operations on multiple screen display call instructions 131.

Beginning of Method.

A flow point 200A indicates a beginning of the method 200.

At a step 211, one or more programmers enter one or more instructions 131 into the programmer workstation no for use by the app 130. The programmer workstation no can show the one or more instructions 131 to the one or more programmers in a format that allows for ease of code construction, ease of editing, ease of detecting errors, or other factors.

At a step 212, the system 100, optionally with the assistance of the one or more programmers, identifies those one or more screen display call instructions 131. As a part of this step, the system 100, again optionally with the assistance of the one or more programmers, identifies one or more parameters for those one or more screen display call instructions 131 that direct the presentation device 140 to output one or more signals to one or more users 150, along with, for each of those one or more screen display call instructions 131, one or more parameters associated therewith.

At a step 213, the system 100, optionally with the assistance of the one or more translators, identifies one or more alternative instructions that could be performed at the programmer workstation no using an alternative human, natural language with its user interface (UI), but otherwise with substantially the same effect. Typically, this includes identifying those parameters associated with each of those one or more screen display call instructions 131 that specify text (such as English text), and replacing that text with new text (such as with German text having the same meaning).

As part of this step, the system 100, optionally with the assistance of the one or more programmers, appends new instructions after the screen display call instruction 131. The new instructions can include a call to a program subroutine library, that write over the part of the screen written to by the screen display call instruction 131, changing the English text to German text (in this example). As there are several possibilities to the format of the original screen display call instruction 131, there are several possibilities with respect to how the system 100 modifies the program instructions 131 near or around the screen display call instructions 131.

I—If the programmer did not use the success check block 134, the system 100 inserts the new instructions 131 into where the check for the success check block 134 would otherwise have been placed. The new instructions 131, as described herein, include one or more calls to one or more program subroutines (not shown) in one or more program subroutine libraries (not shown). The program subroutines in the program subroutine libraries change the English text to the substituted German text (in this example), examine the signal for the success check block 134, and take appropriate action with respect to the original program instructions 131. If the original programmers did not check the signal for the success check block 134, the system 100 leaves this alone in the original program instructions 131.

II—If the programmer did use the success check block 134, the system 100 inserts the new instructions 131 after the original check for the success check block 134. In one embodiment, the system 100 can make a subroutine call after one or more locations after the first check for the success check block 134, where the subroutine call changes the English text to the substituted German text (in this example), examines this second signal for the success check block 134, and takes appropriate action as if the first check for the success check block 134 had instead returned whatever the second signal for the success check block 134 actually returned.

Inserting new instructions is known in the art; however, one way the system 100 could proceed would be to (a) write a subroutine call onto one or more locations after the first check for the success check block 134, (b) have the newly-called subroutine perform the one or more instructions 131 that were written over, (c) have the newly-called subroutine return to just after where the one or more instructions 131 that were written over. This preserves all the instructions 131 originally written by the programmer —or more likely, a compiler of the programmer's instructions 131 in a higher-level programming language—, and also performs all the new instructions 131 the system 100 should insert.

III—If the OS, or emulator thereof, does not have a success block check 134 (that is, there is no "ViewDidLoad" check that can be performed), the system 100, possibly with the assistance of one or more programmers, identifies each screen display call instruction 131 in the app, and replaces that screen display call instruction 131 with an altered version thereof (such as changing English text to substituted German text in this example). If any instructions 131 need to be inserted, the program app 130 can be modified as described herein.

While this Application is primarily described with respect to the system 100 being optionally assisted by the one or more programmers (not shown), in the context of the invention, there is no particular requirement for any such limitation. For a first example, the system 100 could be optionally assisted by another programming expert, or semi-expert, or by one or more artificial intelligences, machine learning programs, or other control programs. For a second example, the system 100 could be optionally assisted by one or more translators (not shown), whether using one or more translator workstations (not shown) or otherwise. In alternative embodiments, combinations or conjunctions of the above can be used, or other apparatuses, systems, or methods with substantially the same effect.

At a flow point 220, the system 100 has translated operation of the program into one or more portions of the program app 130, and its instructions 131, from instructions 131 available to the programmer (not shown) to page descriptions of screen images that could be used by the translator (not shown), or presented on the presentation device 140 to the user 150.

Sent to Translator.

In alternative embodiments, at a step 231, the system 100 can optionally send the altered screen display call 131 to the one or more translators, so that the latter can determine if they have sufficient information to translate the presentation, intended to be made by the program app 130, from the source natural language (such as English) to the target natural language (such as French or Mandarin). In such alternative embodiments, the system 100 can receive information from the one or more translators with respect to whether those one or more translators are able to relatively fully use those one or more alternative instructions that could be performed on a translator's workstation with substantially the same effect.

While this Application is primarily described with respect to the system 100 only sending the altered screen display call instructions 131 to the one or more translators (not shown) after the alteration is complete, in the context of the invention, there is no particular requirement for any such limitation. For example, the system 100 can optionally send the altered screen display call instruction 131 as they are being identified or altered, concurrently or in conjunction with their being identified or altered, in a parallel or pipelined manner, or otherwise. Moreover, while this Application is primarily described with respect to the system 100 only receiving feedback from the one or more translators after substantially all of the altered program instructions 131 have been reviewed by the one or more translators, in the context of the invention, there is no particular requirement for any such limitation. For example, the system 100 can optionally return feedback with respect to the altered screen display call instructions 131 as they are being examined or tested by the one or more translators, concurrently or in conjunction with their being so examined or tested, in a parallel or pipelined manner, or otherwise.

While this Application is primarily described with respect to direct communication between the one or more programmer workstations 110 and the one or more translator workstations, in the context of the invention, there is no particular requirement for any such limitation. For example, the one or more programmer workstations 110 and the one or more translator workstations can by coupled by any communication medium, such as a set of shared memory locations on one or more servers, a communication network having one or more routers or switches (such as the Internet), some combination or conjunction thereof, or otherwise.

In one embodiment, the method can include use of a relatively standard protocol for transmitting information, such as the HTTP protocol or a variant thereof. However, in the context of the invention, there is no particular requirement for any such limitation; any suitable communication protocol can be used. Moreover, in one embodiment, communication between the programmer workstation 110 and the translator workstation can include a client-server model of interaction or a peer-peer model of interaction. However, in the context of the invention, there is no particular requirement for any such limitation; communication between the programmer workstation no and the translator workstation can include any other suitable model of interaction.

End of Method.

A flow point 200B indicates an end of the method 200. The method 200 repeats until both the one or more programmers and translators are satisfied with the result. Alternatively, the method 200 may repeat until some selected condition occurs.

Alternative Embodiments

Elements of the apparatuses, systems, and methods are described herein with respect to one or more possible embodiments, and are not intended to be limiting in any way. In the context of the invention, there is no particular requirement for any such limitations as described with respect to any elements of the system. For example, individual elements of the system 100 could be replaced with substitutes that perform similar functions. Moreover, as described herein, many individual elements of the system are optional, and are not required for operation.

Although the one or more control elements of the system are described herein as being executed as if on a single computing device, in the context of the invention, there is no particular requirement for any such limitation. For example, the one or more control elements of the system can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While this Application is primarily described with respect to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. A non-transitory computer storage memory having stored therein computing instructions interpretable that when executed by a processor of a computer, cause the computer to perform steps of:
   receiving information specifying source code of a software program having a first format, said software program being disposed to generate one or more outputs using an output command calling upon an operating system;
   determining whether said operating system includes a success check in a software program instruction set;
   when said operating system includes said success check in said software program instruction set, determining whether computer program has utilized said success check proximate to said output command;
   when said computer program includes and has utilized said success check, inserting a new instruction calling a library subroutine after said success check;
   when said computer program includes and has not utilized said success check, inserting the new instruction calling said library subroutine proximate to said output command;
   when said operating system does not include said success check in said software program instruction set, replacing the output command with an alternative output command;
   rewriting said output commands to, when performed, capture one or more elements of output written using said software program in said first format;
   converting said captured one or more elements of output to provide said software program with a second format making a visual representation of those made by said software program when in said first format;
   performing one or more of said output commands;
   maintaining said captured elements of output in a database; and wherein said steps of converting are responsive to one or more captured elements of outputs maintained in said database;
   translating one or more translatable elements of said output; and
   providing a second database in response to said steps of translating; and localizing alteration said software program in response to said steps of providing a second database;
   wherein said second database is representative of said database, when said database is interpreted as a first human language and said second database is interpreted as a second human language.

2. The non-transitory computer storage memory of claim 1, wherein
   said steps of localizing provide a second software program having representative outputs in a distinct presentation environment, said distinct presentation environment differing from said first software program in one or more of:
   a hardware environment; or
   a software environment.

3. The non-transitory computer storage memory of claim 1, wherein
   said output commands include one or more parameters; and
   said parameters have the property of defining an output in a human language.

4. The non-transitory computer storage memory of claim 1, wherein
   said outputs include one or more of:
   altering a state of a screen;
   producing a buzzing, haptic, or tactile output;
   producing electrical stimulation;
   producing olfactory output; or
   producing output information signals.

5. The non-transitory computer storage memory of claim 1,
   wherein said outputs include producing an audio output.

6. An apparatus including:
   one or more computers, collectively including computer storage memory having stored therein information specifying source code of a software program having a first format, said software program being disposed to generate one or more outputs using an output command calling upon an operating system;
   a source code reviewer, stored in the computer storage memory, disposed to determine whether said operating system includes a success check in a software program instruction set;
   the source code reviewer being disposed to determine, when said operating system does include said success check in said software program instruction set, whether computer program has utilized said success check proximate to an output command;
   the source code reviewer being disposed to insert, when said computer program has utilized said success check, a new software program instruction calling a library subroutine after said success check;

the source code reviewer being disposed to insert, when said computer program has not utilized said success check, the new software program instruction calling said library subroutine proximate to said output command;

the source code reviewer being disposed to replace, when said operating system does not include said success check in said software program instruction set, the output command with an alternative output command;

a source code writer, stored in the computer storage memory, rewriting said output commands to, when performed, capture one or more elements of output using said software program in said first format;

a captured elements converter, stored in the computer storage memory, converting said capture one or more elements of output to provide said software program with a second format making a visual representation representative of those made by said software program when in said first format;

a database maintaining said captured elements of output upon performing one or more of said output commands; wherein said converter is responsive to said outputs maintained in said database; and a second database responsive to translating one or more translatable elements of said output; and a localized alternation of said software program, responsive to said second database;

wherein said second database is representative of said database, when said database is interpreted as a first human language and said second database is interpreted as a second human language.

7. The apparatus of claim 6, wherein said localized alteration provided a second software program having representative outputs in a distinct presentation environment, said distinct presentation environment differing from said first software program in one or more of:

a hardware environment; or a software environment.

8. The apparatus of claim 6, wherein said output commands include one or more parameters; and said parameters have the property of defining an output in a human language.

9. The apparatus of claim 6, wherein said outputs include one or more of:

altering a state of a screen;

producing a buzzing, haptic, or tactile output;

producing electrical stimulation;

producing olfactory output; or producing output information signals.

10. The apparatus of claim 6, wherein said outputs include producing an audio output.

* * * * *